United States Patent
Brown

(10) Patent No.: US 9,928,371 B2
(45) Date of Patent: Mar. 27, 2018

(54) SYSTEMS AND METHODS FOR PROTECTING INFORMATION DISPLAYED ON A USER INTERFACE OF A DEVICE

(71) Applicant: PAYPAL INC., San Jose, CA (US)

(72) Inventor: Scott William Brown, Bennington, NE (US)

(73) Assignee: PAPAL, INC., San Jose, CA (US)

( * ) Notice: Subject to any disclaimer, the term of this patent is extended or adjusted under 35 U.S.C. 154(b) by 0 days.

(21) Appl. No.: 14/548,071

(22) Filed: Nov. 19, 2014

(65) Prior Publication Data

US 2016/0140349 A1    May 19, 2016

(51) Int. Cl.
G06F 21/00 (2013.01)
G06F 21/60 (2013.01)
G09C 5/00 (2006.01)

(52) U.S. Cl.
CPC ............ *G06F 21/602* (2013.01); *G09C 5/00* (2013.01)

(58) Field of Classification Search
CPC .............................. G06F 21/602; G06C 5/00
See application file for complete search history.

(56) References Cited

U.S. PATENT DOCUMENTS

| | | | |
|---|---|---|---|
| 5,936,596 A | 8/1999 | Yoshida et al. | |
| 6,243,060 B1 | 6/2001 | Natori | |
| 6,288,741 B1 | 9/2001 | Alejo Trevijano | |
| 6,633,306 B1 | 10/2003 | Marz et al. | |
| 6,765,550 B2 | 7/2004 | Janick et al. | |
| 7,134,130 B1 * | 11/2006 | Thomas | H04N 7/163 348/E7.061 |
| 8,922,480 B1 | 12/2014 | Freed et al. | |
| 9,069,519 B1 | 6/2015 | Hall | |
| 9,318,041 B2 | 4/2016 | Kawabata et al. | |
| 9,355,612 B1 | 5/2016 | Shepard | |
| 9,552,752 B1 | 1/2017 | Perut | |
| 2001/0028430 A1 | 10/2001 | Koma | |
| 2002/0033923 A1 | 3/2002 | Shimoshikiryou et al. | |
| 2002/0149598 A1 | 10/2002 | Greier et al. | |
| 2002/0158967 A1 | 10/2002 | Janick et al. | |
| 2003/0038924 A1 | 2/2003 | Veligdan et al. | |
| 2003/0043313 A1 | 3/2003 | Minoura | |
| 2005/0099573 A1 | 5/2005 | Kubo et al. | |

(Continued)

OTHER PUBLICATIONS

International Searching Authority, Search Report and Written Opinion of the International Searching Authority for PCT/US2015/063453, dated Feb. 25, 2016, 7 pages.

(Continued)

*Primary Examiner* — Ghodrat Jamshidi
(74) *Attorney, Agent, or Firm* — Haynes and Boone, LLP

(57) ABSTRACT

Embodiments of the present disclosure relate to a device having a display component that protects displayed information. In an example, a system includes a user interface of a device comprising a display module, wherein the user interface receives information entered by a user of the device. The system also includes a detector that detects surroundings around the device or the user of the device. The system further includes at least one hardware processor in communication with the user interface and the detector that automatically protects some or all of the information based on the detected surroundings and causes the automatically protected information to be displayed on the display module.

20 Claims, 5 Drawing Sheets

(56) References Cited

U.S. PATENT DOCUMENTS

| | | | |
|---|---|---|---|
| 2005/0235217 A1 | 10/2005 | Hoe-Richardson | |
| 2006/0056626 A1* | 3/2006 | Keohane | G06F 21/84 380/206 |
| 2006/0126156 A1 | 6/2006 | Evans et al. | |
| 2006/0197739 A1 | 9/2006 | Kastalsky | |
| 2006/0238664 A1 | 10/2006 | Uehara et al. | |
| 2007/0040780 A1 | 2/2007 | Gass et al. | |
| 2007/0040975 A1 | 2/2007 | Momoi | |
| 2007/0222915 A1 | 9/2007 | Niioka et al. | |
| 2008/0107274 A1* | 5/2008 | Worthy | G06F 21/602 380/278 |
| 2008/0143755 A1 | 6/2008 | Sung et al. | |
| 2008/0284843 A1 | 11/2008 | Jo | |
| 2009/0096710 A1 | 4/2009 | Raman et al. | |
| 2009/0115943 A1 | 5/2009 | Gaides | |
| 2009/0242142 A1 | 10/2009 | Bellwood et al. | |
| 2010/0085517 A1 | 4/2010 | Hong | |
| 2010/0124363 A1 | 5/2010 | Ek et al. | |
| 2010/0149459 A1 | 6/2010 | Yabuta et al. | |
| 2010/0220043 A1 | 9/2010 | Broughton et al. | |
| 2011/0001712 A1 | 1/2011 | Saito | |
| 2011/0018860 A1 | 1/2011 | Perry-Jones et al. | |
| 2011/0058115 A1 | 3/2011 | Matsushima et al. | |
| 2011/0173438 A1* | 7/2011 | Matzkel | H04L 9/0833 713/150 |
| 2011/0203745 A1 | 8/2011 | Abreu | |
| 2012/0013610 A1 | 1/2012 | Chae | |
| 2012/0050342 A1 | 3/2012 | Huang et al. | |
| 2012/0050651 A1 | 3/2012 | Huang et al. | |
| 2012/0168070 A1 | 7/2012 | Nelson et al. | |
| 2012/0300046 A1 | 11/2012 | Blayvas | |
| 2013/0076673 A1 | 3/2013 | Sirpal | |
| 2013/0083999 A1 | 4/2013 | Bhardwaj | |
| 2013/0300648 A1 | 11/2013 | Kim | |
| 2014/0029810 A1 | 1/2014 | Barr et al. | |
| 2014/0108791 A1* | 4/2014 | Sinclair | H04L 63/0823 713/164 |
| 2014/0118423 A1 | 5/2014 | Hasegawa et al. | |
| 2014/0146069 A1 | 5/2014 | Tan et al. | |
| 2014/0201544 A1 | 7/2014 | Tai | |
| 2014/0201844 A1 | 7/2014 | Buck | |
| 2014/0254927 A1 | 9/2014 | Bhardwaj et al. | |
| 2014/0337175 A1 | 11/2014 | Katzin | |
| 2015/0009563 A1 | 1/2015 | Lauters et al. | |
| 2015/0058941 A1* | 2/2015 | Lyman | H04L 63/08 726/6 |
| 2015/0070386 A1 | 3/2015 | Ferens | |
| 2015/0085251 A1 | 3/2015 | Larsen | |
| 2015/0109674 A1 | 4/2015 | Cok | |
| 2015/0235609 A1 | 8/2015 | Hall | |
| 2015/0249673 A1 | 9/2015 | Niemoeller | |
| 2016/0071448 A1 | 3/2016 | Schwarz et al. | |
| 2016/0098692 A1 | 4/2016 | Johnson et al. | |
| 2016/0098700 A1 | 4/2016 | Johnson et al. | |
| 2016/0098709 A1 | 4/2016 | Johnson et al. | |
| 2016/0210473 A1 | 7/2016 | Cohen et al. | |
| 2016/0300081 A1 | 10/2016 | Weksler et al. | |
| 2016/0345001 A1 | 11/2016 | Baek et al. | |
| 2016/0351539 A1 | 12/2016 | Bower et al. | |
| 2017/0082894 A1 | 3/2017 | Katsuta et al. | |

OTHER PUBLICATIONS

Eyetracking, Inc., "About Us: What is Eyetracking?"; Solana Beach, CA 92075, USA, www.eyetracking.com, 2011, 2 pages.

Fujitsu Laboratories Ltd., Kawasaki, Japan, "Fujitsu Develops Eye Tracking Technology," Oct. 2, 2012, 4 pages.

Huang, Weidong, Handbook of Human Centric Visualization, "Visual Analysis of Eye Tracking Data" Springer Link, http://link.springer.com, Springer International Publishing AG, Jun. 25, 2013, 5 pages.

Yamada T., Gohshi S., Echizen I. (2013) "Enhancement of Method for Preventing Unauthorized Copying of Displayed Information Using Object Surface Reflection," The International Workshop on Digital Forensics and Watermarking 2012. Lecture Notes in Computer Science, vol. 7809. Springer, Berlin, Heidelberg.

Yamada T., Gohshi S., and Echizen I., "Preventing Unauthorized Copying of Displayed Information by Utilizing Differences in Spectral Sensitivity Between Humans and Imaging Devices," 2012 IEEE International Workshop on Information Forensics and Security (WIFS), Tenerife, 2012, pp. 145-150.

Gao Z., Zhai G., Zhou J., Min X. and Hu C., "Information Security Display Via Uncrowded Window," 2014 IEEE Visual Communications and Image Processing Conference, Valletta, 2014, pp. 454-457.

* cited by examiner

FIG. 2

Live Buy Now — 202
Item price: $5.00    $5.00
Quantity: 1
Item total    $5.00
Total $5.00 USD

---

Encrypted Option View 204    *PayPal*

Log in to your account to complete the purchase

▽ Pay with a debit or credit card, or PayPal Credit
(Optional) Join PayPal for faster future checkout Country: United States ▽

| Debit or Prepaid Gift Card | Credit Card | PayPal Credit Special Offer | 206 |

Encrypt All    Encrypt by line

The secure way to use your debit card online
$0 liability on unauthorized PayPal transactions Debit or Prepaid gift card number: 4111************   [X] 208
Payment types: VISA MasterCard DISCOVER
Expiration date: mm / yy   [X] ← 206a
CSC: ***   *What is this?*   [X] ← 206b Billing information
First name: J*****h   [X] ← 206c
Last name: S******e   [X] ← 206d
Address line 1: 1 ***    [X] ← 206e
Address line 2 (optional):   [X] ← 206f
City/State: Omaha   NE ▼
ZIP code: 68144
Shipping address: ☑ Same as billing address Contact information
Phone type: Mobile ▼
*Why is this needed?*
Phone number: 555-555-1234   402-*-**   [X]

Email: J*****@e**l.com   [X] ← 206n

Add special instructions to the Add

• • •

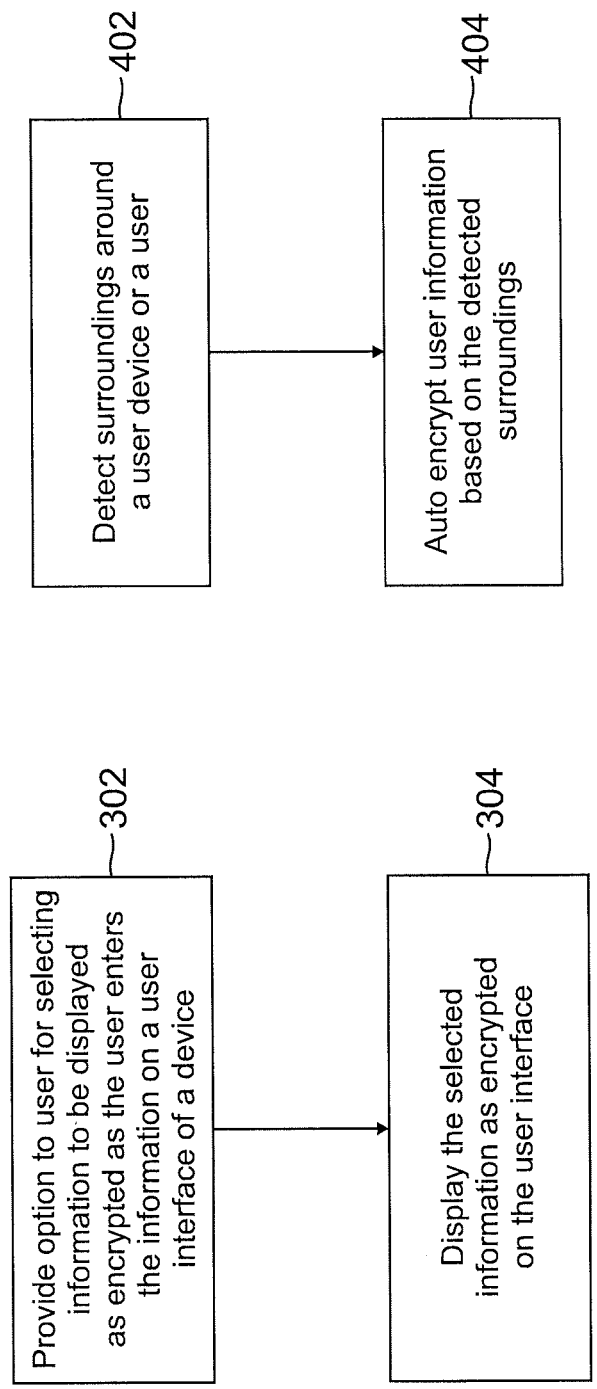

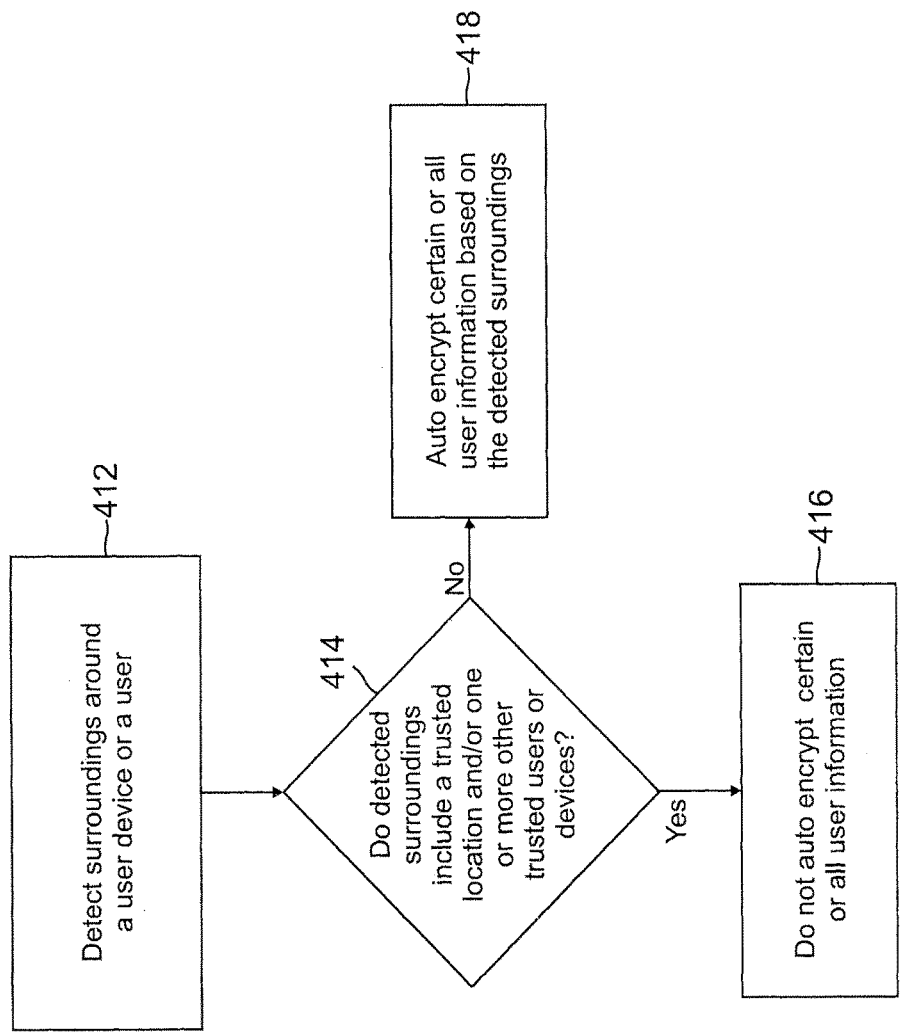

SYSTEMS AND METHODS FOR PROTECTING INFORMATION DISPLAYED ON A USER INTERFACE OF A DEVICE

TECHNICAL FIELD

Embodiments of the present disclosure generally relate to a device having a user interface, and more specifically, to a user interface of a device having a display component to protect displayed information.

BACKGROUND

Users regularly engage in electronic commerce using their user devices (e.g., mobile devices). In that regard, users can purchase items, bid on items, exchange data, or conduct many types of electronic transactions over their user devices. In some situations, a user may conduct an electronic transaction in a public place such as a coffee shop, a train station, a crowded airport, etc. In these public places, there may be many people standing around, some of which may be able to see information that the user is entering into an interface of the user device in connection with a transaction. As such, private user information such as credit card information or other personal information may be exposed to potentially wandering eyes.

BRIEF DESCRIPTION OF THE DRAWINGS

FIG. 2 illustrates a user interface of a device displaying an encrypted option view of an exemplary check out page hosted by a service provider according to an embodiment of the present disclosure;

FIG. 3 is a flow diagram illustrating a method for providing a user an option to encrypt information displayed on a user device according to an embodiment of the present disclosure;

FIGS. 4 and 4a are flow diagrams illustrating methods for automatically encrypting information displayed on a user device according to one or more embodiments of the present disclosure.

Figure 1:
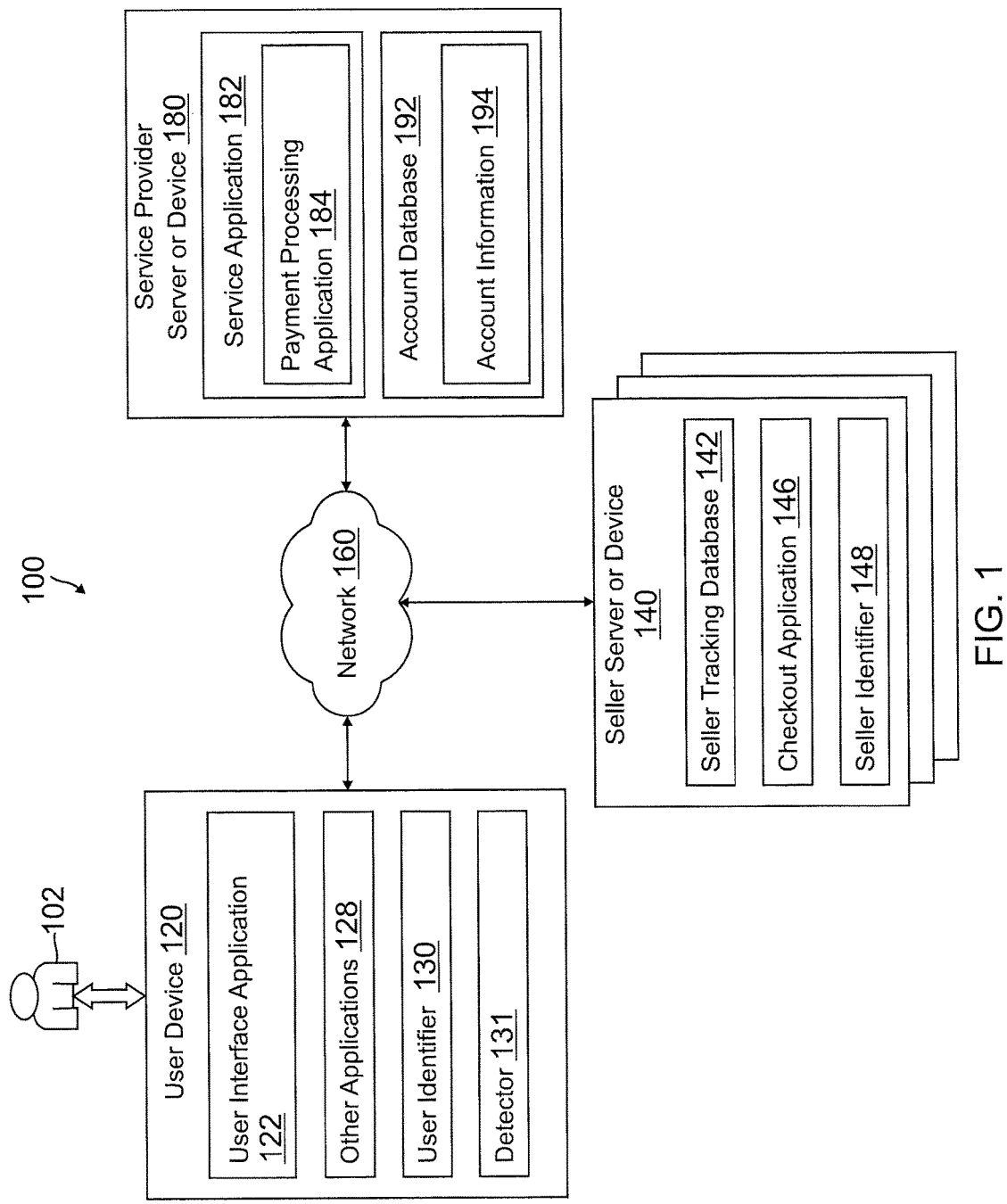
FIG. 1 is a block diagram illustrating a system for encrypting information displayed on a user interface of a device according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one or more embodiments of the present disclosure, systems and methods are provided for a device having a display component that displays encrypted information, thus avoiding potential exposure of information to people located in the vicinity of the device. As used herein, "encrypted" information includes any information that is not readable/discernible or not readily readable/discernible by a human or a device. Examples of encrypted information include, but are not limited to, masked, redacted, or blanked out fields, lines, or characters, display of the same or random characters or symbols in the fields or lines, etc.

In various embodiments, a user may utilize a device, such as a mobile device, a merchant's Point of Sale terminal, a public computer, etc., for many activities such as engaging in transactions, for example, shopping, purchasing items, bidding on items, exchanging data, drafting documents or correspondence, etc. In an embodiment, the device may include specialized hardware and/or software allowing the user to select some or all of the information or data to be displayed as encrypted as the user enters the data into the user interface of the device. In another embodiment, the device may include specialized hardware and/or software for auto-encrypting information or data entered by the user on the device based on surroundings detected around the device or the user. As a result of encrypting and displaying encrypted user information or data, people that may be present in the vicinity of the device or the user may be kept from seeing the user's information that the user enters on the user interface.

In current situations, for example, when a user of a computing device types in or otherwise enters user information such as a user name or a user account number and a password into a merchant's website or app, only the password may be shown as encrypted, but not the rest of the user's information. For instance, as the user types in the user's password into a field displayed on the website on the device, the password may appear encrypted, for example it may be replaced by symbols such as stars, i.e., as "*********". However, the user name or other user information that the user types is displayed in a normal non-encrypted, readable/discernible form. As such, in current situations, user information that is sensitive or private such as a user name, an account number, credit card information, contact information, etc., may be viewable by people standing around in the vicinity of the device or the user.

According to an embodiment of the present disclosure, a user of a device may be given an option to encrypt all or specific parts of user information that the user enters on a user interface of the device. For example, a user may wish to pay for an item purchased from a merchant over a device (e.g., a mobile device, a merchant's POS terminal, a public computer, etc.) where people are standing around. As the user enters (e.g., types in, speaks, uses gestures, etc.) user information including confidential or personal ("private") information such as a user's contact information, payment or credit card information, address, social security number, date of birth, mother's maiden name, etc. into the user interface of the device, the user or the merchant is provided an option to display all or part of the user information as encrypted (e.g., just the credit card information, or just the user's address, or any combination, or all of the user information, etc.). As such, the user or the merchant may control the information to be encrypted in order to avoid the information from being seen by people standing around the device or the user.

Furthermore, according to one or more embodiments herein, information entered by a user on a user interface of a device may be automatically encrypted based on the surroundings detected at the time of a transaction. For example, specialized hardware and/or software of the device may detect that a user is conducting a transaction over the device in an environment where people are standing around. For instance, one or more components of the device may detect that there are lots of people in the vicinity such as in a coffee shop, a restaurant, a crowded airport, a train station, a hotel lobby, a park, or any other public place.

In this regard, the user device may include one or more components for detecting surroundings such as detectors or sensors adapted to detect a crowded space. For example, detectors or sensors may be adapted to detect other people's user devices, motion, temperature, etc. Also, a geo-location services component may determine a location of the user device (and the user), for example, a location in a specific place of business. Furthermore, the user device may be adapted to determine an IP address as the user device accesses or connects to a WiFi node, for example, WiFi provided by a public place such as a coffee shop, a hotel lobby, etc. In one example, a component or module of the user device may detect a dangerous location, for example by determining a zip code, a street or an area.

Advantageously, according to various embodiments, systems and methods may provide an option to a user of a device to encrypt some or all user information that is displayed on a user interface of the device. Furthermore, systems and methods may auto encrypt user information entered by a user of a device based on surroundings detected around the user or the device. As such, information entered by a user of the device may appear encrypted, thus protecting against potential wandering eyes and improving privacy and security.

Referring now to the drawings wherein the showings are for purposes of illustrating embodiments of the present disclosure only, and not for purposes of limiting the same, FIG. 1 is a block diagram illustrating a system for encrypting information displayed on a user interface of a device according to an embodiment of the present disclosure.

A system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

FIG. 1 illustrates an embodiment of a block diagram of a system 100 adapted to encrypt information to be displayed, wherein the information is entered by a user 102 on a user device 120. As shown in FIG. 1, the system 100 includes at least one user device 120 (e.g., network computing device), one or more seller servers or devices 140 (e.g., network server devices), and at least one service provider server or device 180 (e.g., network server device) in communication over a network 160.

The network 160, in one embodiment, may be implemented as a single network or a combination of multiple networks. For example, in various embodiments, the network 160 may include the Internet and/or one or more intranets, cloud, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120, seller servers or devices 140, and service provider server or device 180 may be associated with a particular link (e.g., a link such as a URL (Uniform Resource Locator) to an IP (Internet Protocol) address).

User device 120, seller server or device 140, and service provider server or device 180 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

The user device 120, in various embodiments, may be implemented using any appropriate combination of hardware and/or software configured for wired and/or wireless communication over the network 160. In various examples, the user device 120 may be implemented as a mobile device such as a smart phone, a tablet, a personal digital assistant (PDA), a notebook computer, a wearable device such as a wristwatch, eyeglasses, etc., a personal computer, and/or various other generally known types of wired and/or wireless computing devices.

User device 120, in one embodiment, includes a user interface application 122, which may be utilized by user 102 to engage in activities such as conducting transactions (e.g., shopping, purchasing, bidding, etc.) with service provider server or device 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server or device 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access seller websites or lists of inventories via the one or more seller servers or devices 140 to view and select applications, products and/or services ("items") for purchase, and the user 102 is able to purchase items from the one or more seller servers or devices 140 via the service provider server or device 180. Accordingly, user 102 may conduct transactions such as financial transactions (e.g., view, purchase and pay for items) from the one or more seller servers or devices 140 via the service provider server or device 180.

User device 120, in various embodiments, may include other applications 128 as may be desired in one or more embodiments of the present disclosure to provide additional features available to user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122 for improved efficiency and convenience.

According to one or more embodiments, user interface application 122 or other applications 128 may include an application that may be loaded on user device 120 from service provider server or device 180 or from a seller server or device 140, or from any other appropriate entity server. Such application enables user device 120 to encrypt user-selected information as the information is entered on user device 120. In an embodiment, the application enables user device 120 to detect surroundings nearby or in proximity to the user device 120, for example, people standing nearby may be detected via their user devices (even ones not running the application), or via motion detectors, temperature sensors, or any other appropriate detector or sensor. For example, one or more sensors or detectors 131 may detect other nearby user devices, for example, by using the user device's WiFi as nearby user devices are located in a proximity of the user device 120, such as within a certain range, region, area, or radius (e.g., within about a 1, 2 or 3 meter radius), or in front of a hotspot WiFi, Bluetooth range, or the like. In an embodiment, sensor or detector 131 may be used to gather information about signals (e.g., radio signals) transmitted by other nearby user devices. Raw signal strength information along with known locations of user device 120 may be converted into locations of the nearby user device locations (and correspondingly, nearby people). In another embodiment, user device 120 may determine surroundings via an IP address associated with a location or an entity or seller, for example, in response to user device 120 accessing or connecting to a WiFi node (e.g., provided by a public place such as a coffee shop, an airport, a hotel lobby, etc.).

In addition, it is possible that geo-location using for example a Global Positioning Satellite (GPS) may be used to identify the location of a geo-location enabled user device 120 (and correspondingly user 102). That is, transactions made over user device 120 may provide location information of the user device 120 via, for example, GPS. The location of user device 120 may be helpful in establishing surroundings, for example, a location may correspond to a public place such as a coffee shop, a hotel lobby, etc. In an embodiment, the location of user device 120 may indicate a dangerous area or zone, for example, as determined by a zip code, the name of an area or a street, etc., and in such cases, encrypting user information may become even more important.

According to an embodiment, user device 120 may include at least one user identifier 130, which may be implemented, for example, as operating system registry entries, cookies associated with the user interface application 122, identifiers associated with hardware of the user device 120, or various other appropriate identifiers. The user identifier 130 may include one or more attributes related to user 102, such as personal information related to user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, user identifier 130 may be passed with a user login request to the service provider server or device 180 via the network 160, and the user identifier 130 may be used by the service provider server or device 180 to associate the user 102 with a particular user account maintained by the service provider server or device 180.

The one or more seller servers or devices 140, in various embodiments, may be maintained by one or more individuals or business entities, profit or non-profit (or in some cases, by a partner of a business entity that processes transactions on behalf of business entities). It should be appreciated that individuals or business entities may also be referred to as "sellers" or "merchants" without departing from the scope of the present disclosure. Examples of sellers include merchant sites or locations such as retail stores, resource information sites or locations, utility sites or locations, real estate management sites or locations, etc., which may offer various items for purchase and payment.

In some embodiments, users may register user identity information with the sellers or with the service provider over the network 160. As such, each of the one or more seller servers or devices 140 may include a seller tracking database 142 for detecting and/or identifying users and their associated user devices. It should be appreciated that although a user-seller transaction is illustrated in this embodiment, the system may also be applicable to user-user, seller-seller and/or seller-user transactions.

Each of the seller servers or devices 140, in one embodiment, may include a checkout application 146, which may be configured to facilitate financial transactions (e.g., purchase transactions) by the user 102 of items offered by the seller. As such, in one aspect, the checkout application 146 may be configured to accept payment information from the user 102 over the network 160.

Each of the seller servers or devices 140, in one embodiment, may include at least one seller identifier 148, which may be included as part of the one or more items and/or services made available for purchase so that, e.g., particular items and/or services are associated with particular sellers. In one implementation, the seller identifier 148 may include one or more attributes and/or parameters related to the seller, such as business and banking information. User 102 may conduct transactions such as financial transactions (e.g., selection, monitoring, purchasing, and/or providing payment for items) with each seller server or device 140 via service provider server or device 180 over network 160.

In various embodiments, user device 120 and/or seller server or device 140 respectively includes at least one communication module (not shown) adapted to communicate with each other and/or with service provider server or device 180 over network 160 and/or directly. Thus, the respective communication module may include a DSL (e.g., Digital Subscriber Line) modem, a PSTN (Public Switched Telephone Network) modem, an Ethernet device, a broadband device, a satellite device and/or various other types of direct wired and/or wireless network communication devices including microwave, radio frequency, infrared, Bluetooth, and near field communication components. The respective communication module may communicate directly with another nearby device using short range communications, such as Bluetooth Low Energy, LTE Direct, radio frequency, infrared, Bluetooth, and near field communications. Thus, the respective communication module may include various specialized short range communication modules that may connect with nearby devices.

Service provider server or device 180, in one embodiment, may be maintained by a transaction processing entity, which may provide processing for financial transactions and/or information transactions between the user 102 and one or more of the seller servers or devices 140. As such, service provider server or device 180 includes a service application 182, which may be adapted to interact with each user device 120 and/or each seller server or device 140 over the network 160 to facilitate identification of the user 102 as well as the selection, purchase, and/or payment of items by the user 102 from one or more of the seller servers or devices 140. In one example, the service provider server or device 180 may be provided by PayPal®, Inc. and/or eBay®, Inc. of San Jose, Calif., USA.

The service application 182, in one embodiment, utilizes a payment processing module 184 to process purchases and/or payments for financial transactions between the user 102 and each of the seller servers 140. In one implementation, the payment processing module 184 assists with resolving financial transactions through validation, delivery, and settlement. As such, the service application 182 in conjunction with the payment processing module 184 settles indebtedness between user 102 and each of the seller servers or devices 140, wherein accounts may be directly and/or automatically debited and/or credited of monetary funds in a manner as accepted by the banking industry.

It should be noted that service application 182 including payment processing application 184, as well as user interface application 122, other applications 128, and checkout application 146 may correspond to processes, procedures, and/or applications executable by a hardware processor, for example, a software program. In other embodiments, user device 120, seller server or device 140 and service provider server or device 180 may include additional or different software as required.

The service provider server or device 180, in one embodiment, may be configured to maintain one or more user accounts and seller accounts in, an account database 192, each of which may include account information 194 associated with one or more individual users (e.g., user 102) and sellers (e.g., one or more sellers associated with seller servers or devices 140). For example, account information 194 may include private financial information of each user 102 and each seller associated with the one or more seller servers 140, such as one or more account numbers, passwords, credit card information, banking information; or other types of financial information, which may be used to facilitate financial transactions between the user 102 and the one or more sellers associated with the seller servers 140. In various aspects, the methods and systems described herein may be modified to accommodate users and/or sellers that may or may not be associated with at least one existing user account and/or seller account, respectively.

In one implementation, user 102 may have identity attributes stored with the service provider server 180, and the user 102 may have credentials to authenticate or verify identity with the service provider server or device 180. User attributes may include personal information, banking information and/or funding sources as previously described. In various aspects, the user attributes may be passed to the service provider server or device 180 as part of a login, selection, purchase, and/or payment request, and the user attributes may be utilized by the service provider server 180 to associate the user 102 with one or more particular user accounts maintained by the service provider server 180. In this regard, according to various embodiments, some or all user attributes may include private information that should be encrypted in order to keep such attributes from being displayed in certain surroundings.

In various embodiments, service provider server or device 180 includes at least one communication module (not shown) adapted to communicate with network 160 including user device 120 and/or seller server or device 140. In various embodiments, the network interface component may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

The system described above with respect to the embodiment of FIG. 1 may include specialized hardware and/or software components used for encrypting information displayed on a user device. In an embodiment, the system may provide a user or a seller an option to select all or one or more portions of the information to be encrypted. In another embodiment, the system may auto encrypt the information based on detected surroundings, including, for example, a location of the user and/or other devices or users near the user device or the user.

Referring now to FIG. 2, a user interface displaying an encrypted option view of an exemplary checkout page hosted by a service provider is illustrated according to an embodiment of the present disclosure.

In one or more embodiments, a user may conduct a transaction such as purchasing an item from a merchant using a payment service provider such as PayPal®, Inc. The payment service provider may host a checkout page that is displayed on a display component of a user interface 202 of a user device. In an embodiment, the displayed checkout page may provide an encrypted option view 204. Encrypted option view 204 may provide a user of the user device an option to select user information that is to be displayed as encrypted as the user enters information into one or more fields displayed therein. It should be noted that a checkout page may be hosted by a merchant or by any other appropriate entity. Also, in various embodiments, an add-on, a plug-in built into a browser, or the like may be used.

In an embodiment, user interface 202 may present one or more interfaces 206a-206n that provides options for the user to encrypt information line by line or field by field. That is, the user may instruct which fields to encrypt. Interfaces 206a-206n may be designated by a label 206 that reads for example "Encrypt by line", or by any other appropriate label. Interfaces 206a-206n may be presented in the form of selectable icons, links, buttons, or the like, which may be displayed next to one or more fields or lines where the user may enter information. Each interface 206a-206n may provide the option to encrypt a corresponding field. For example, a user may select (e.g., click, press, etc.) interface 206a in order to encrypt a payment card number such as "Debit or Prepaid gift card number" in its corresponding field. In addition, the user may also select interface 206b in order to encrypt "Expiration date" of a payment card in its corresponding field. It should be appreciated that in various embodiments, the user may be given an option to select any one or more interfaces such as interfaces 206a-206n in order to encrypt any corresponding information in any desired combination.

In another aspect, user interface 202 may present an interface 208 that provides an option for the user to encrypt all the information that is entered including all information that the user enters into the various lines or fields of the checkout page. Interface 208 may be presented in the form of a selectable icon, link, button, or the like, and may be labeled by any appropriate label. For example, interface 208 may be labeled as "Encrypt All". In response to a user selecting (e.g., clicking, pressing, etc.) interface 208, all the information entered by the user into the various fields is encrypted, for example, all information from "Debit or Prepaid gift card number" through and including "Email" information as presented in the checkout page.

In various embodiments, in response to a user's selections, for example, by using interface 208, or any interface 206a-206n or a combination thereof, user interface 202 may display the information in the respective lines or fields as encrypted information. For example, a field may display encrypted information such as a debit card number, an expiration date, etc. in the form of one or more digits, characters or symbols such as stars (i.e., "********") instead of the actual information. Advantageously, the encrypting maintains the privacy of the information that is entered.

Referring now to FIG. 3, a flow diagram illustrates a method for providing a user an option to encrypt information displayed on a user device according to an embodiment of the present disclosure. It should be noted that the method illustrated in FIG. 3 may be implemented by the system illustrated in FIG. 1 according to an embodiment.

In block 302, a user may be presented an option to select information that is to be displayed as encrypted as the user enters the information on or through a user interface of a device. In an embodiment, in the course of entering user information, for example in the course of conducting a transaction with a merchant via a service provider server, a user may be presented with an encrypted option view or page such as a checkout page hosted by a service provider server or by a merchant as illustrated above with respect to the embodiment of FIG. 2. It should be noted that a user interface may present or display an encrypted option view for entering information in connection with any purpose where privacy may be desired, including for example, drafting a document or correspondence, data entry, etc. As described above according to one or more embodiments, a user entering information into an interface of a user device may select to encrypt all or only portions of information being entered.

In block 304, the user interface displays the selected information as encrypted. Advantageously, a user or a merchant may determine which information is to be kept private such that people in a surrounding environment may see information in an encrypted mode, but may not see the actual information, thus protecting the private information of the user.

Referring now to FIGS. 4 and 4a, flow diagrams illustrate methods for automatically encrypting information displayed on a user device according to one or more embodiments of the present disclosure. It should be noted that the methods illustrated in FIGS. 4 and 4a may be implemented by the system illustrated in FIG. 1 according to one or more embodiments.

In block 402 of FIG. 4, a user device may detect the surroundings around a user device (and consequently a user). For example, as described above according to one or more embodiments, specialized hardware and/or software of the user device may detect that a user is entering information into a user interface of the user device (e.g., in connection with conducting a transaction) in a public environment such as in an environment where people are standing around. For example, one or more components of the device may detect that there are lots of people in the vicinity such as in a coffee shop, a restaurant, a crowded airport, a train station, a hotel lobby, a park, or any other public place.

In this regard, the user device may include one or more components for detecting surroundings such as detectors or sensors adapted to detect a crowded space. For example, detectors or sensors may be adapted to detect other people's user devices, motion, temperature, etc. The user device may also include a geo-location services component that may determine a location of the user device (and the user), for example, a location in a public place such as a specific place of business. In one example, the user device may detect a dangerous location, for example by determining a zip code, a street or an area. Furthermore, the user device may be adapted to determine IP addresses as the user device accesses or connects to a WiFi node, for example, WiFi provided by a public place such as a coffee shop, a hotel lobby, etc.

In block 404, user information may be auto-encrypted based on the detected surroundings. For example, information may be auto-encrypted in response to one or more components or modules of the user device detecting a situation where displaying information as encrypted is desirable, for example, a crowded space, a public place location or IP address, a dangerous location, etc.

Referring now to FIG. 4a, in various other embodiments, even though other users or devices may be detected near the user or device, certain user information such as information entered into certain fields or all fields (referring for example to the fields illustrated in the embodiment of FIG. 2 such as "Debit or Prepaid gift card number", "Payment types", etc.) may not need to be encrypted. For example, certain information such as information entered into certain fields or all fields may not need to be encrypted based on certain detected surroundings of the user or device, for instance, based on the user location, which may be determined to be a trusted location, or based on the identity or identities of the people detected near the user or the device.

In block 412 of FIG. 4a, a user device may detect the surroundings around the user device (and consequently a user). For example, as described above according to one or more embodiments, specialized hardware and/or software of the user device may detect that a user is entering information into a user interface of the user device (e.g., in connection with conducting a transaction) in a certain location or where people are located in the vicinity of the user or the device.

In block 414, the system may determine whether the detected surroundings include a safe or trusted location and/or one or more other trusted users or devices. In some embodiments, as described above, the user device may include one or more components for detecting surroundings such as detectors or sensors adapted to detect a certain location. For example, the user device may include a geo-location services component that may determine a location of the user device (and the user), for example, a location such as the user's home, office, etc., which may be a safe or trusted location. In an example, the user device may detect that a user is entering information at home, a location that may be identified or designated as a safe or trusted location and/or where trusted people are detected nearby, such as the user's spouse.

In yet other embodiments, even though one or more other users or devices may be detected near the user or device in a detected public location, the other user(s) or device(s) near the user or device may be identified as trusted user(s) or device(s). For example, the system may detect a device next to the user's device, but may identify the other device as belonging to or associated with the user's spouse. In one example, a trusted device may be a device sharing an account such as a spouse or a relative sharing a communications carrier account, a payment provider account or any other account, or in another example, the other device or user may be designated as "trusted", for example, via a contacts list stored in a non-transitory memory of the user device.

In block 416, if the system determines that the detected surroundings include a trusted location and/or one or more other trusted users of devices, certain or all user information may not be automatically encrypted. In an example, a user may be entering information at home, a location that may be identified or designated as a trusted location and/or where trusted people are detected nearby, such as the user's spouse. As such, the risk of exposing private information to unintended people may not be present and would not require encrypting the information entered by the user.

In another example, even if the device detects a public location, certain information such as certain fields may remain unencrypted if only trusted users are detected near the user or device. That is, even though other users or devices may be detected near the user or device such as in a public location, certain user information (e.g., information entered into certain fields or all fields) may not need to be encrypted based on identities of others near the user or device, for example, the user's spouse.

In further embodiments, only certain user information such as only certain fields may be automatically encrypted based on the identity of the other user or device that is detected nearby. For example, user information such as a user's date of birth may be encrypted when others not associated with the user are detected near the user in a public location, but the user's date of birth may be left unencrypted if a relative or friend of the user is detected next to the user, based on the assumption that the user's date of birth is not something the user would need to prevent the relative or friend from seeing. In various examples, the identity or identities of other nearby users may be determined via technologies such as Bluetooth, or by detection of the same Wi-Fi network, or by detection of a nearby user that is designated as associated with the user such as a spouse, relative, etc. for example in a contacts list, or by any other appropriate process or technology.

In block 418, in embodiments where the detected surroundings do not include a trusted location and/or one or more other trusted users or devices, the system may automatically encrypt certain or all user information based on the detected surroundings. For example, the system may encrypt certain or all fields or lines of information entered by the user in a public place as described above according to one or more embodiments.

According to one or more embodiments, automatic encryption of user information may be dynamic and may be learned from typical user behaviors or histories. For instance, the user may normally manually select specific information (e.g., fields) to be encrypted or may select to encrypt the specific information at specific locations. For example, if the user always encrypts the user's mother's maiden name when entering information at a merchant location, the system may automatically encrypt that field when the user is detected at the same or similar locations. As such, in response to the user or device detecting certain types of location such as specific business locations, any typical user behaviors or histories associated with the types of locations may determine all or portions of the user information to be encrypted. Such user behaviors or histories may be stored in a non-transitory memory of the user device, or in a database such as account database 192 (illustrated in the embodiment of FIG. 1) maintained by service provider server or device 180 or seller tracking database 142 maintained by seller server or device 142.

Advantageously, according to various embodiments, systems and methods may auto encrypt user information entered by a user of a device based on surroundings detected around the user or the user device. As such, information entered by a user of the device may appear encrypted, thus protecting against potential wandering eyes and improving privacy and security.

Figure 5:
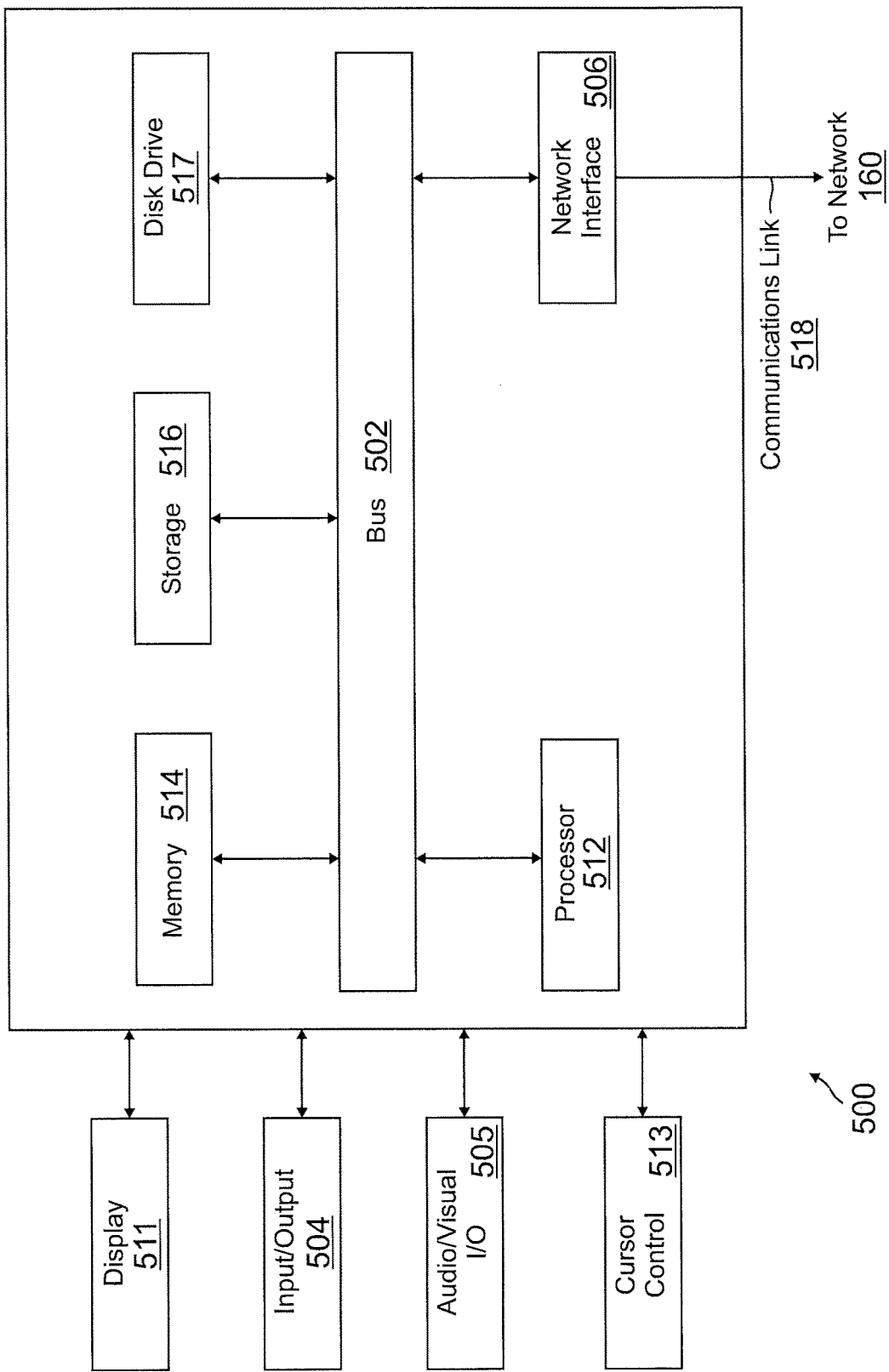
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The seller server or device and/or service provider server or device may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting interfaces e.g., keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a seller server or device, or a service provider server or device via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system comprising:
   a non-transitory memory storing instructions; and
   one or more hardware processors coupled to the non-transitory memory and configured to read the instructions from the non-transitory memory to cause the computer system to perform operations comprising:
   providing, by one or more of the hardware processors, a user interface comprising a first user interface option to display a group of fields as masked and additional user interface options each corresponding to at least one of the fields, wherein selection of one of the additional user interface options causes data of an associated field to be displayed as masked;
   receiving, from a first computing device, a selection for one of the additional user interface options from a user at a first physical location;
   causing masking of data of a field associated with the selected additional user interface option at the first physical location;
   automatically masking the data of the selected field associated with the additional user interface option at a second physical location different than the first physical location based on determining that the first physical location is associated with the second physical location;
   detecting a second computing device at the second physical location; and
   causing unmasking of the masked data of the field associated with the selected additional user interface option at the second physical location based on the detecting.

2. The computer system of claim 1, wherein at least one of the additional user interface options allows a user to mask a plurality of fields associated with a section of the user interface.

3. The computer system of claim 1, wherein the data of the selected field is partially masked.

4. A computer system comprising:
   a non-transitory memory storing instructions; and
   one or more hardware processors coupled to the non-transitory memory and configured to read the instructions from the non-transitory memory to cause the computer system to perform operations comprising:
   receiving, by one or more of the hardware processors, user information for display on a user interface of a first computing device at a first physical location;
   detecting, by one or more of the hardware processors, surroundings of the first computing device at the first physical location;
   automatically masking the user information on the user interface based on a user preference associated with the detected surroundings of the first physical location;
   automatically masking, by one or more of the hardware processors, the user information on the user interface at a second physical location different than the first physical location based on the user preference and determining that the second physical location is associated with the first physical location; and
   automatically removing, by one or more of the hardware processors, the masking applied to the user information at the second physical location based on detecting a second computing device in proximity to the first computing device at the second physical location, the second computing device being associated with a trusted party.

5. The computer system of claim 4, wherein the detecting indicates that the first physical location is a public environment.

6. The computer system of claim 4, wherein the masking is automatically removed based on a determined identity of the trusted party associated with the second computing device.

7. The computer system of claim 4, wherein a current user of the second computing device shares an account associated with the user information.

8. The computer system of claim 4, wherein the user information further is masked at the first physical location based on previous masking of the user information performed by an associated user.

9. The computer system of claim 4, wherein the trusted party is associated with a contacts list associated with the first computing device.

10. The computer system of claim 4, wherein some of the user information is displayed as unmasked data on the user interface when the detecting indicates that the first computing device is located in a trusted environment.

11. The computer system of claim 4, wherein the detecting involves a geolocation services component for detecting a current physical location of the first computing device.

12. The computer system of claim 11, wherein the current physical location detected by the geolocation services component is associated with a physical location where the user information is to be masked.

13. The computer system of claim 4, wherein a detector determines the surroundings, at least in part, based on one or more IP addresses or wireless nodes associated with the first computing device.

14. The computer system of claim 4, wherein the operations further comprise:
  masking the user information when the detecting indicates that the surroundings comprise a public location.

15. The computer system of claim 4, wherein the first computing device is participating in an e-commerce transaction at the first physical location.

16. A computer-implemented method comprising:
  receiving, by one or more hardware processors, user information for display on a user interface of a first computing device;
  detecting, by one or more of the hardware processors, surroundings of the first computing device at a first physical location;
  masking, by one or more of the hardware processors, on the display a first part of the user information based on the detecting of the surroundings and one or more user preferences associated with the surroundings; and
  automatically masking, by one or more of the hardware processors, the user information on the display at a second physical location different than the first physical location at a later time based on determining that the second physical location is associated with the first physical location.

17. The computer-implemented method of claim 16, further comprising:
  masking all of the user information when the detecting indicates that a second computing device associated with an untrusted person is present in the surroundings.

18. The computer-implemented method of claim 16, further comprising removing at least a portion of the masking of the user information at the first physical location when a second computing device associated with a trusted person is detected in the surroundings.

19. The computer-implemented method of claim 16, wherein the user interface is a page associated with an electronic transaction.

20. A non-transitory machine-readable medium having stored thereon machine-readable instructions executable to cause a machine to perform operations comprising:
  receiving user information for display on a user interface of a first computing device;
  detecting surroundings associated with the first computing device at a first physical location;
  masking, the user information on the display at the first physical location based on a user preference and detecting a second computing device associated with an untrusted person in the surroundings at the first physical location; and
  masking, the user information on the display at an unknown physical location different than the first physical location based on determining a plurality of common attributes between the first physical location and the unknown physical location.

* * * * *